Feb. 24, 1959

A. J. PETZINGER 2,875,408

VOLT-AMPERE MEASURING INSTRUMENT

Filed Oct. 22, 1956

INVENTOR
Ambrose J. Petzinger
BY
ATTORNEY

Feb. 24, 1959  A. J. PETZINGER  2,875,408
VOLT-AMPERE MEASURING INSTRUMENT
Filed Oct. 22, 1956  2 Sheets-Sheet 2

United States Patent Office 2,875,408
Patented Feb. 24, 1959

2,875,408

VOLT-AMPERE MEASURING INSTRUMENT

Ambrose J. Petzinger, Glen Rock, N. J., assignor to Westinghouse Electric Corporation, East Pittsburgh, Pa., a corporation of Pennsylvania Application October 22, 1956, Serial No. 617,446

22 Claims. (Cl. 324—141)

This invention relates to devices responsive to volt-amperes of an electrical circuit, and it has particular relation to measuring instruments suitable for measuring the volt-amperes of alternating-current circuits.

If the voltage of a single-phase alternating-current circuit remains constant, the current flowing in the circuit is proportional to the volt-amperes of the circuit. Consequently, an ammeter may be employed for indicating the volt-amperes of the electrical circuit and the scale of the ammeter may be calibrated directly in volt-amperes.

In a somewhat similar manner, it may be shown that if the phase voltages of a polyphase electrical circuit remained equal in magnitude and balanced in phase, the positive-sequence current flowing in the polyphase circuit is a measure of the volt-amperes of the circuit. For this reason, an instrument responsive to the positive-sequence current of the polyphase electrical circuit may be employed for measuring the volt-amperes of the circuit and the scale of the instrument may be calibrated directly in volt-amperes. Circuits and apparatus for measuring volt-amperes in this manner are set forth in my patent application Serial No. 709,029, filed November 9, 1946, and in the patent application of A. J. Petzinger et al. Serial No. 709,030, filed November 9, 1946. These patent applications are now Patents 2,513,890 and 2,513,891.

Apparatus similar to that discussed in the preceding paragraphs is commercially available in this country and has a substantial field of application. However, in some electrical systems the voltages vary sufficiently in magnitude to introduce appreciable errors if apparatus is employed as discussed in the preceding paragraphs for the purpose of measuring volt-amperes.

In accordance with the invention, current-responsive driving mechanism is employed in the manner discussed in the preceding paragraphs for the purpose of measuring or responding to the volt-amperes of an electrical circuit. In order to compensate for variations in magnitude of the voltage of an electrical circuit in which the volt-amperes are to be measured, a voltage-responsive driving mechanism is provided. The driving mechanisms conveniently may be of the thermomotive multimetallic spring type. The two mechanisms are coupled to each other by linkage which is proportioned to provide a resultant response which correctly portrays the volt-amperes of an electrical circuit over a substantial range of variation in magnitude of both voltage and current.

In accordance with one embodiment of the invention, the current and voltage responsive driving mechanisms are associated with a watthour meter in a compact assembly. In this assembly, the voltage-responsive driving mechanism and the voltage winding of the watthour meter may be energized from a common source. In an analogous manner, the current-responsive driving mechanism and the current winding of the watthour meter may be energized from a common source of current. In order to measure the volt-amperes of a polyphase circuit, a network may be provided which is energized from the polyphase circuit to provide an output proportional to the positive-sequence current of the polyphase circuit.

It is, therefore, an object of the invention to provide improved apparatus which is responsive to the volt-amperes of an electrical circuit.

It is a further object of the invention to provide current-responsive driving mechanism and voltage-responsive driving mechanism which are coupled through linkage proportioned to provide a resultant output representative of the volt-amperes of an electrical circuit from which the driving mechanisms are energized.

It is another object of the invention to provide a compact measuring assembly incorporating the mechanisms set forth in the preceding paragraph in combination with a watthour meter.

It is also an object of the invention to provide a measuring assembly as set forth in either of the immediately preceding two objects wherein the driving mechanisms are of the thermoresponsive spring type.

Other objects of the invention will be apparent from the following description taken in conjunction with the accompanying drawing, in which.

Figure 1:
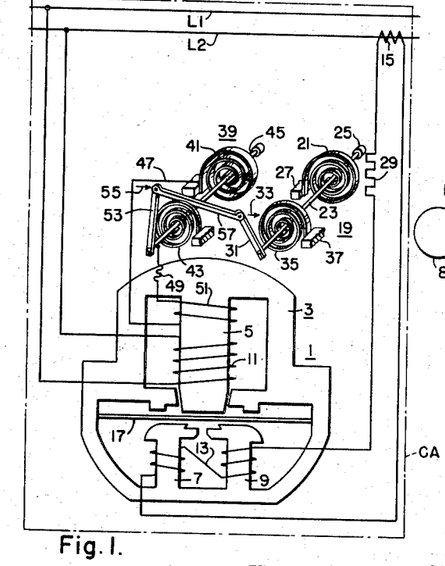
Figure 1 is a schematic view with parts shown in perspective and parts shown in elevation and with parts broken away of a measuring assembly embodying the invention.

Referring to the drawing, Fig. 1 shows an electrical circuit represented by two conductors L1 and L2. The circuit may operate at any desired voltage and frequency but for the purpose of discussion, it will be assumed that the circuit is a conventional alternating-current circuit operating at 120 volts and at a frequency of 60 cycles per second.

In order to measure the energy supplied by the alternating-current circuit, a watthour meter 1 is provided. This watthour meter includes a magnetic structure 3 having a voltage pole 5 and two current poles 7 and 9. A voltage winding 11 surrounds the voltage pole and is connected for energization in accordance with the voltage between the conductors L1 and L2. A current winding 13 having portions surrounding the two current poles 7 and 9 is connected for energization from the secondary winding of a current transformer 15 which has its primary winding connected for energization in accordance with current flowing in the conductor L2. An electroconductive disk 17 is mounted for rotation with respect to the magnetic structure 3. The disk 17 has a portion located in the air gap between the voltage pole 5 and the current poles 7 and 9.

The structure of the watthour meter as thus far described is conventional in the art. It will be understood that a permanent magnet (not shown) is employed for damping rotation of the disk 17. In addition, a suitable register (not shown) is provided for counting the rotations of the disk. It will be understood that when the voltage and current windings are energized, a shifting magnetic field is produced in the air gap which rotates the disk 17 in accordance with the energy supplied by the alternating-current circuit. Since such a watthour meter is well known in the art, a more detailed discussion thereof is believed to be unnecessary.

In order to measure the volt-amperes of the alternating-current circuit, a current-responsive driving mechanism 19 is provided. The current-responsive driving mechanism may be of various constructions but in a preferred embodiment of the invention, a thermomotive element represented by a spiral multi-metallic spring 21 is provided. The multi-metallic spring, for example, may have two laminations of metals which have different temperature coefficients of expansion. Consequently, when the spring is heated, the outer end thereof tends to move with respect to the inner end of the spring. Such springs are well known in the art. The inner end of the spring 21 is secured to a shaft 23 which is mounted for rotation with respect to a supporting structure in suitable bearings represented by a bearing 25. The outer end of the spring 21 is secured to a lug 27 which forms a part of the supporting structure.

Heat is supplied to the spring 21 by means of a heater 29. Conveniently the heater 29 may be connected in series with the current winding 13 for energization from the secondary winding of the current transformer 15.

It will be understood that when the current through the heater 29 increases more heat is supplied to the spring 21 and the spring 21 tends to rotate the shaft 23 in a predetermined direction which will be assumed to be clockwise, as viewed in Fig. 1. An arm 31 is secured to the shaft 23 and clockwise rotation of the shaft tends to move the arm in the direction indicated by the arrow 33. Consequently, rotation of the arm 31 represents the current flowing in the alternating-current circuit and it also indicates the volt-amperes of the circuit as long as the voltage of the circuit remains at a predetermined normal value.

In order to compensate the spring 21 for variations in ambient temperature, a second spring 35 is provided which is similar in construction to the spring 21. The spring 35 has its inner end secured to the shaft 23 and its outer end secured to a lug 37 which forms a part of the supporting structure. By inspection of Fig. 1, it will be observed that the springs 21 and 35 are reversed or opposed with respect to each other. Consequently variations in ambient temperature produce opposite and equal changes in the torques applied by the two springs to the shaft 23.

The springs 21 and 35, the shaft 23 and the heater 29 may be similar to the springs 16 and 17, the shaft 20 and the heater 21 disclosed in the Vassar Patent 2,323,738. Furthermore, the housing or the shaft and springs may be exactly similar to the housing provided for the corresponding components in the Vassar patent. It should be noted, however, that all of the heaters illustrated in the Vassar patent are not employed. Heat is applied only to the spring 21 in the present case.

In order to compensate the current-responsive driving mechanism 19 for variations in magnitude of the voltage of the alternating-current circuit, a voltage-responsive driving mechanism 39 is provided. The voltage-responsive driving mechanism includes a bimetallic spring 41, a bimetallic spring 43 and a shaft 45 which correspond to the springs 21 and 35 and shaft 23 of the current-responsive driving mechanism 19. Furthermore, the springs 41 and 43 and the shaft 45 may be mounted in a housing similar to the housing provided for the current-responsive driving mechanism 19.

The bimetallic spring 41 may be heated in the same manner employed for heating the bimetallic spring 21. However, in Fig. 1, heat is directly supplied to the bimetallic spring 41. To this end, a conductor 47 is connected to the outer end of the bimetallic spring and a flexible conductor 49 is connected to the shaft 45. Inasmuch as the shaft is of an electroconductive material and is electroconductively secured to the inner end of the bimetallic spring 41, the voltage applied between the conductors 47 and 49 produces a current flow through the bimetallic spring 41. The current generates heat because of the electrical resistance inherent in the spring. The voltage applied to the conductors 47 and 49 is proportional to the voltage across the conductors L1 and L2. The voltage may be derived directly from the conductors or it may be supplied through any suitable transformer. Conveniently such a voltage may be derived from a winding 51 which is mutually coupled to the voltage winding 11. Consequently, the windings 11 and 51 constitute respectively the primary and secondary windings of a voltage transformer.

The springs 41 and 43 are not necessarily of the same construction. For example, the spring 41 may have a substantial positive temperature coefficient of resistance. If the spring is heated for any reason, the electrical resistance of the spring increases. In the present case the spring 41 is directly heated and the heating thereof by electrical current is proportional to $E^2/R$ where E represents the applied voltage and R represents the spring resistance. As the temperature of the spring increases, the resistance of the spring increases and the increase in spring resistance tends to reduce the spring torque. To compensate for this additional factor the springs 41 and 43 may be made dissimilar. Excellent compensation has been obtained by making the springs of the same construction except that the spring 43 is narrower and consequently has less torque than the spring 41. In one practical embodiment of the invention the spring 43 had half the width of the spring 41, but otherwise was similar in construction. For a no-voltage condition, the dissimilar springs would not compensate fully for ambient temperature variations, but this is not an operating condition. Over the operating range a spring 43 which is half the width of the spring 41 has provided excellent compensation.

An arm 53 is secured to the shaft 45 for rotation therewith. This arm would tend to rotate in accordance with the voltage of the alternating-current circuit. It will be understood that the spring 43 substantially compensates the spring 41 for variations in ambient temperature. The construction may be such that an increase in current flowing through the spring 41 rotates the shaft 45 in a clockwise direction, as viewed in Fig. 1, and rotates the arm 53 in the direction indicated by the arrow 55.

Compensation for variations in the voltage of the alternating-current circuit is provided for the arm 31 by means of suitable linkage. This linkage in Fig. 1 is represented by a link 57 which has its ends pivotally connected to the arms 31 and 53.

Figures 2, 4, 5:
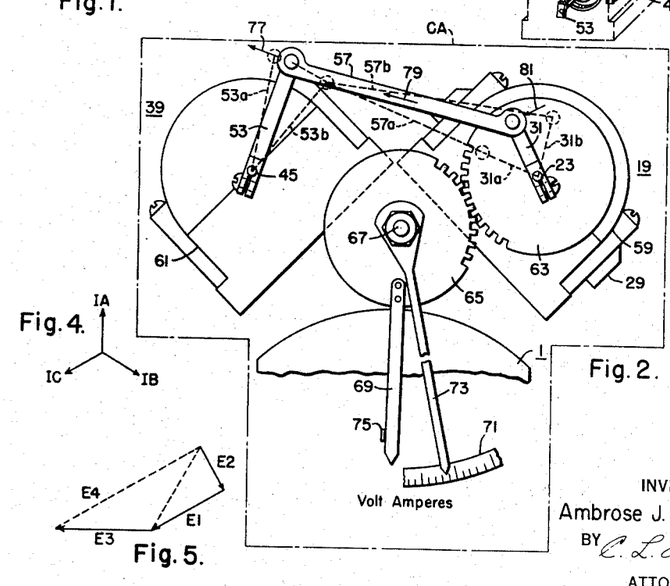
Fig. 2 is a view in front elevation with parts broken away showing a portion of the measuring assembly illustrated in Fig. 1.
Figs. 4 and 5 are vector diagrams showing the relationships of voltages and currents in Fig. 3.

The association of the various components may be understood further by reference to Fig. 2. The current-responsive driving mechanism is illustrated with its housing 59 which corresponds to the housing 28 of the aforesaid Vassar patent. A similar housing 61 is provided for the voltage-responsive driving mechanism 39. It will be noted that the housings are angularly displaced from each other about an axis parallel to the axes of their shafts. Such displacement facilitates a compact location of the mechanisms above the watthour meter 1. In the specific embodiment herein illustrated, a displacement of substantially 90° is employed.

It will be noted that the shaft 23 has a spur gear 63 secured thereto. This spur gear meshes with a spur gear 65 which is mounted for rotation about a shaft 67. The gear 65 has secured thereto an indicating pointer 69 which cooperates with a scale 71. This scale may be calibrated directly in volt-amperes.

A maximum-demand pointer 73 is frictionally mounted on the shaft 67 for rotation thereabout. This pointer 73 remains in any position to which it is rotated. Rotation of the pointer 73 is effected by means of a lip 75 secured to the pointer 69. The pointer 69 is located in a plane behind the pointer 73 as viewed in Fig. 2. When the pointer 69 moves up scale, the lip 75 engages the pointer 73 to drive the maximum-demand pointer up scale. Thus the maximum-demand pointer remains in a position corresponding to its maximum displacement by the pointer 69. Such pointers are well understood in the art.

The configurations of the link 57 and the arms 53 and 31 depend to a substantial extent on the characteristics of the driving mechanism. In the present case, the heat supplied by the heater 29 is proportional substantially to the square of the current energizing the heater. Therefore, the output of the current-responsive driving mechanism is proportional substantially to the square of the current input thereto. Somewhat similar comments apply to the voltage-responsive driving mechanism.

Fig. 2 shows proportions which have been found suitable for conventional bimetallic springs. It will be noted that the arm 31 is substantially shorter than the arm 53. The angular positions of the arms are such that when the current-responsive driving mechanism is deenergized, the arm 31, the link 57 and the arm 53 occupy, respectively, the positions illustrated by the dotted lines 31a, 57a and 53a. When the current-responsive driving mechanism is deenergized the arm 31 and the link 57 are substantially in alignment as shown by the dotted lines 31a and 57a.

When the current-responsive mechanism is fully energized, the arm 31 may occupy a position illustrated by the broken line 31b. At the same time, the link 57 and the arm 53 occupy the positions represented, respectively, by the broken lines 57b and 53b.

In explaining the operation of the linkage, it will be convenient to consider the various forces involved. The voltage-responsive driving mechanism applies a bias to the current-responsive driving mechanism which urges the arm 31 in a counterclockwise direction, as viewed in Fig. 2, with a force that decreases as the voltage of the alternating-current circuit increases. The force developed by the voltage-responsive driving mechanism is represented in Fig. 2 by a vector 77 which is applied to the pivot connecting the link 57 and the arm 53 and which acts in a direction at right angles to the arm 53. The force represented by the vector 77 has a component 79 which is parallel to the link 57. The vector 79 has a magnitude which depends in part on the angular relationship existing between the arm 53 and the link 57. If the arm and the link are perpendicular to each other, the vectors 77 and 79 are equal. As the angle between the arm 53 and the link 57 departs from the perpendicular relationship, the component represented by the vector 79 increases.

The link 57 applies a force component represented by the vector 79 to the pivot between the link and the arm 31 which has a component represented by a vector 81 acting in a direction perpendicular to the arm 31. When the arm 31 is perpendicular to the link 57, the force components represented by the vectors 79 and 81 are equal. As the link and arm depart from the perpendicular relationship, the force component represented by the vector 81 becomes a continuously smaller proportion of the force component 79 until when the link and arm occupy the positions represented by the dotted lines 31a and 57a the force component represented by the vector 81 is zero. Consequently, when the current-responsive driving mechanism is deenergized, the voltage-responsive driving mechanism has virtually no effect on the position of the arm 31. This explanation is based on the assumption that the voltage-responsive driving mechanism always exercises a restraining torque on the current-responsive driving mechanism. The assumed relations of the linkage members have the desirable feature that when the meter is once adjusted the voltage-responsive driving mechanism has no effect on the zero setting. However, if desired, the arm 53 and other parts of the linkage may be dimensioned and positioned to permit the voltage-responsive driving mechanism to apply an aiding torque to the current-responsive driving mechanism proportioned to compensate for voltage variations, and to permit the application of torque in the zero position of the mechanism.

On the other hand, when the arm 31 and the link 57 are in the positions represented by the broken lines 31b and 57b, the forces represented by the vectors 79 and 81 are substantially equal and the voltage-responsive driving mechanism strongly biases the arm 31 in the counterclockwise direction.

The pointer 69 of Fig. 2 does not have a straight-line response of displacement relative to volt amperes, but a well-distributed scale is obtained. Straight-line response may be substantially obtained by proper correlation of the spring torques and the linkage geometry. For example, to make the response more straight the arm 53 and the link 57 may be shortened. Since the force exerted by the voltage-responsive driving mechanism on the arm 31 as represented by the vector 81 increases substantially from zero to a maximum as the arm moves from the position represented by the dotted line 31a to the position represented by the broken line 31b, the square-law response of the current-responsive driving mechanism may be converted into a response of the pointer 69 which is more closely a straight-line response.

It will be noted that the angular change between the arm 31 and the link 57 as the shaft 23 rotates is greater than that between the link 57 and the arm 53. For this reason, the force represented by the vector 79 has comparatively less dependence on the position of the arm 31 than the dependence of the force represented by the vector 81 on the position of the arm 31. The variation in the force represented by the vector 79 under these conditions may be decreased further by increasing the length of the arm 53 or conversely may be increased by decreasing the length of the arm 53.

By a study of the force vectors, it will be seen that the scale distribution of the scale 71 may be controlled to a very substantial extent by proper selection of the lengths of the arms and the link.

The voltage compensation introduced by the voltage-responsive driving mechanism makes the volt-ampere measuring device reasonably accurate over a substantial range of variation of both voltage and current. If the voltage increases, the bias exerted by the voltage-responsive driving mechanism on the current-responsive driving mechanism decreases and permits the current-responsive driving mechanism to move the gear 63 in a clockwise direction, as viewed in Fig. 2, to move the pointer 69 up scale, thereby indicating a larger value of volt-amperes. The converse is also true.

The mechanism illustrated in Fig. 2 also may be employed for measuring the volt-amperes of a polyphase circuit. Since only the bimetallic springs 41 and 21 are heated, the connections may be illustrated in Fig. 3 for the bimetallic spring 41 and the heater 29 associated with the bimetallic spring 21.

Figure 3:
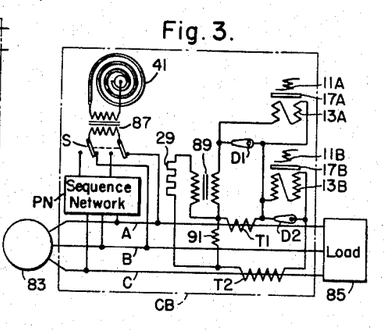
Fig. 3 is a schematic view illustrating the application of the invention to the measurement of the volt-amperes of a polyphase circuit.

In Fig. 3, a polyphase generator 83 supplies electrical energy to a load 85 through phase conductors A, B and C. It will be assumed that a three-wire, three-phase circuit is employed and the generator 83 as a specific example may be delta-connected. Inasmuch as the voltages between the phase conductors A, B and C ordinarily always will be substantially balanced in phase, the voltage between the phase conductors A and B alone need be employed for energizing the bimetallic spring 41. Such energization is effected through a voltage transformer 87. (The expression "balanced in phase" is intended to mean that the voltages always have the same phase relationship. In the case of the three-phase system the three-phase voltages always are displaced from each other in phase by the usual 120°.) However, the bimetallic spring 41, if desired, may be heated in accordance with the voltages of two or more phases. For example, the primary winding of the transformer 87 may be energized in accordance with the positive-sequence voltage of the polyphase circuit through a conventional positive-sequence network or filter PN. A two-pole, double-throw switch S is provided for connecting the primary winding of the transformer 87 for energization from either the conductors A and B or the output of the network PN. The heater 29 is energized from the polyphase circuit in accordance with the positive-sequence component of current in the polyphase circuit. Suitable networks for this purpose are illustrated in the aforesaid copending patent applications and are available commercially in this country. However, a suitable embodiment is illustrated in Fig. 3.

In Fig. 3, a current transformer T1 has its primary winding connected for energization in accordance with current flowing through the phase conductor A. A second current transformer T2 has its primary windings connected for energization in accordance with current flowing in the phase conductor C. It will be assumed that the current transformer T1 has a 1:1 ratio, whereas the current transformer T2 has a 2:1 ratio. In other words, the secondary winding of the transformer T2 delivers a current having a magnitude which is one-half of the magnitude of the primary winding current.

The secondary winding of the current transformer T1 is connected to energize the primary winding of a mutual reactor 89. The secondary winding of the current transformer T2 is connected to energize in series the primary winding of the mutual reactor 89 and a resistor 91. The voltage across the resistor 91 and the voltage across the secondary winding of the mutual reactor 89 in series energize the heater 29.

In order to describe briefly the operation of the system illustrated in Fig. 3, it will be assumed that the generator 83 supplies a balanced load 85 and that the currents flowing through the three-phase conductors A, B and C are represented as shown in Fig. 4, by vectors IA, IB and IC. These vectors are equal in magnitude and are displaced from each other in phase by 120°. It may be assumed that each of the phase currents has a magnitude of 5 amperes.

Let it be assumed further that the resistor 91 has a resistance represented by the expression $R=\sqrt{3}wM$ where R represents the resistance of the resistor 91, $w$ represents the frequency multiplied by $2\pi$ and M represents the mutual inductance of the mutual reactor 89. Assume further that the heater 29 is open circuited.

The secondary winding of the transformer T2 supplies a current of 2½ amperes to the resistor 91 and the primary winding of the mutual reactor in series. This produces a voltage E1 across the resistor 91 having a voltage magnitude of $E1=2.5\sqrt{3}wM$. By inspection of Figs. 4 and 5, it will be noted that the voltage E1 is in phase with the current IC.

In addition, the current flowing through the mutual reactor produces across the secondary of the mutual reactor, a voltage having a magnitude $E2=2.5wM$. The voltage E2 leads the current IC by 90°.

The secondary winding of the transformer T1 supplies a current of 5 amperes to the primary winding of the mutual reactor 89. This current in flowing through the primary winding produces a voltage across the secondary winding of the mutual reactor having a magnitude of $E3=5wM$. The voltage E3 across the secondary of the mutual reactor leads the current IA by 90°. The sum of the three vectors E1–E2–E3 produces a resultant single-phase voltage $E4=5\sqrt{3}wM$ volts. The transformers T1 and T2, the resistor 91 and the mutual reactor 89 constitute components of a positive-sequence current filter which has a single-phase voltage output proportional to the positive-sequence current of the polyphase circuit. The resultant voltage E4 is applied to the heater 29 and is proportional to the volt-amperes of the polyphase circuit as long as the phase voltages remain equal in magnitude and balanced in phase.

The compensation for variation in voltage magnitude of the polyphase circuit is provided by the heating of the bimetallic spring 41. It will be understood that if the apparatus of Fig. 2 is employed for measuring the volt-amperes of the polyphase circuit, as illustrated in Fig. 3, the watthour meter 1 of Fig. 2 would be replaced by a conventional polyphase watthour meter.

The mutual reactance of the windings, the resistance RH of the heater 29 and the resistance of the resistor 91 may be made substantially independent of temperature. Even with these precautions a slight residual ambient-temperature error may be present in the current-responsive driving mechanism and such error if present may be compensated by proper selection of the heater 29.

It will be assumed first that the current-responsive driving mechanism when employed alone has a deflection which decreases with increase in ambient temperature. To compensate for this error the heater 29 may be constructed of a material having a small temperature coefficient of resistance, for example a small positive temperature coefficient of resistance. A certain ratio of $RH/wM$ produces optimum deflection of the current-responsive driving mechanism. To compensate for the error the ratio $RH/wM$ is deliberately selected to be below the value producing the optimum deflection at a low ambient temperature. As the ambient temperature increases the ratio $RH/wM$ also increases towards a value giving optimum deflection of the current-responsive driving mechanism. This increase is for the reason that the heater has a positive temperature coefficient of resistance and is proportioned to compensate for the previously-mentioned error.

If the mechanism tends to read high in response to an increase in ambient temperature the ratio $RH/wM$ at a low ambient temperature may be selected to be adjacent the value which produces optimum deflection.

Figure 6:
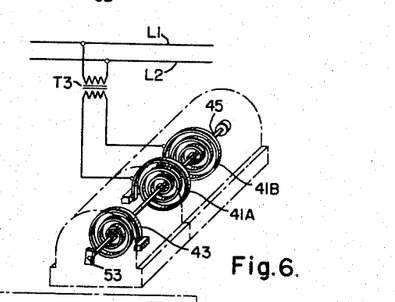
Fig. 6 is a schematic view with parts in perspective and parts broken away showing a modified form of the invention.

The voltage-responsive driving mechanism conveniently may be modified as shown in Fig. 6. In this modification the spring 41 of Fig. 1 is replaced by two multimetallic spiral springs 41A and 41B which may be similar in construction. The outer ends of the springs 41A and 41B are connected to the terminals of the secondary winding of a transformer T3 which has its primary winding connected across the conductors L1 and L2. The transformer T3 corresponds to the transformer represented by the windings 11 and 51 of Fig. 1.

By replacing the spring 41 by two springs 41A and 41B it is possible to omit the flexible connection 49 (Fig. 1) to the shaft 45. The voltage-responsive driving mechanism of Fig. 6 otherwise is similar to that of Fig. 1.

The construction of Fig. 6 also facilitates the use of three springs 43, 41A and 41B which may be of identical construction. It will be recalled that the spring 43 may be half as wide as the spring 41 of Fig. 1. It will be understood that the springs 41A and 41B, if employed, would be located in the portion of the housing which otherwise would be occupied by the spring 41. The springs 41A and 41B would be located within one enclosure whereas the spring 43 would be located in a separate enclosure heated substantially only by ambient temperature.

The springs 41A and 41B may be energized by different voltages. For example, if the springs 41A and 41B are employed in place of the spring 41 of Fig. 3, the spring 41A may be energized by the voltage across the phase conductors A and B, whereas the spring 41B may be energized in accordance with the voltage across the phase conductors B and C. However, such energizations may require a connection to the shaft 45. The energization shown in Fig. 6 or the energization from the sequence network of Fig. 3 is preferred.

If the sum of the widths of the springs 41A and 41B equals the width of the spring 41, the temperature compensation and torque values of the three springs of Fig. 6 are not necessarily the same as those of the springs 41 and 43 of Fig. 1. This is mainly for the reason that the total torque of the two narrow springs 41A and 41B is not exactly the same as that of one spring constructed of similar material and equal in width to the sum of the widths of the springs 41A and 41B. Consequently, some temperature compensation may be desirable if three exactly similar springs 43, 41A and 41B are to be employed.

A temperature error which is present in one of the mechanisms such as the voltage-responsive driving mechanism may be compensated to a substantial extent by introducing a temperature error in the other of the mechanisms which acts in a balancing direction. For example, if the voltage-responsive driving mechanism has a resultant temperature error such that the torque exerted thereby on the linkage increases as the ambient temperature increases, the heater 29 may be constructed of a material having a temperature coefficient of resistance which causes the torque exerted by the current-responsive driving mechanism on the linkage to increase with an increase in ambient temperature. In this way the temperature errors of the two mechanisms are opposed to each other and may be proportioned to balance substantially over an appreciable range of operation of the meter.

The measuring equipment herein described preferably is located within a suitable casing construction. Thus a casing CA for the measuring equipment is illustrated in Figs. 1 and 2 by broken lines. Such a casing may be similar in construction to that disclosed in the aforesaid Vassar patent. If desired, the current transformer 15 of Fig. 1 may be located within the casing CA.

Although considerable attention has been given for a number of years to the provision of a compact assembly of a polyphase integrating meter and a polyphase demand meter in a common casing, difficulty has been experienced because of the increased size and complexity of the components. However, by departing from the conventional construction of polyphase integrating meters, I have succeeded in combining a polyphase integrating meter and a thermo-responsive demand meter in a compact casing.

Referring again to Fig. 3, it will be noted that a polyphase integrating meter is schematically illustrated. This meter includes a first element which has a voltage winding 11A and current windings 13A. These windings when energized produce a shifting magnetic field. An electroconductive armature 17A is located within the shifting magnetic field. The windings 11A and 13A may be similar respectively to the windings 11 and 13 of Fig. 1, and may be similarly associated with a magnetic structure. The armature 17A of Fig. 3 may be similar to the armature 17 of Fig. 1.

The polyphase integrating meter of Fig. 3 includes a second element which has a voltage winding 11B and current windings 13B. These windings produce a magnetic field within which an electroconductive armature 17B is located. It will be understood that the armatures 17A and 17B are magnetically connected for rotation as a unit. Plural element polyphase integrating meters of the general type illustrated in Fig. 3 are well known in the art.

In conventional two-element polyphase meters it is the practice to employ similar current windings for the two elements. In accordance with the present invention, the current windings 13A and 13B are purposely dissimilar for reasons which will be presented below.

It will be recalled that current transformers T1 and T2 are employed for supplying current to a positive sequence network. These transformers have different ratios of transformation. The current windings 13A and 13B are designed for energization respectively from the current transformers T1 and T2. Thus if the current transformer T2 has half the current output of the current transformer T1 for the same primary energization thereof, the current windings 13B may have twice as many turns as the current windings 13A. When so designed, the current windings 13A and 13B produce the same number of ampere turns for the same primary energizations of the transformers T1 and T2.

By inspection of Fig. 3 it will be noted that links D1 and D2 are provided. When the links are in their closed positions as illustrated in Fig. 3, the secondary windings of the transformers T1 and T2 are connected directly to the positive sequence network. It will be appreciated that the positive sequence network has first and second input terminals. The first input terminals correspond to the terminals of the secondary winding of the transformer T1. The second input terminals correspond to the terminals of the secondary winding of the transformer T2.

When the link D1 is opened, the current winding 13A and the primary winding of the mutual reactor 89 are connected in series across the secondary winding of the transformer T1. When the link D2 is opened, the current windings 13B are connected in series with the primary winding of the mutual reactor 89 and the resistor 91 across the secondary of the current transformer T2. Consequently the current windings 13A and 13B are energized respectively in accordance with currents flowing through the phase conductors A and C. Although the current transformers have different ratios of transformation, the current windings 13A and 13B have different number of turns proportioned to produce the same ampere turns for the same primary energizations of the transformers T1 and T2.

The voltage windings 11A and 11B may be energized from the voltages appearing between the phase conductors A, B and C in a manner well understood in the art. If voltage transformers are employed for energizing the voltage windings 11A and 11B from the associated polyphase circuit, the same voltage transformers may be employed for energizing the sequence network PN.

By employing the same current transformers for supplying energy both to the current windings 13A and 13B, and to the positive sequence network, the space required is materially reduced. I have found it possible to place the polyphase two-element integrating meter together with the positive sequence network, the transformers T1 and T2, the current-responsive driving mechanism 19, the voltage-responsive driving mechanism 39 together with the associated linkage and scales in a casing CB of reasonably small proportions. It will be understood that the two-element polyphase integrating member of Fig. 3 would replace the meter 1 illustrated in Fig. 2 for polyphase operation.

The driving mechanisms of Figs. 1 and 2 have substantial inherent compliance or resilience in the multimetallic springs. If desired compliance may be introduced at other points in the mechanism. For example, either or both arms 31 or 53 may be constructed of spring material. As a further example, the link 57 may be in the form of a spring such as a coil or helical spring. However, the specific construction illustrated in Figs. 1 and 2 represents a prefered embodiment of the invention.

The embodiment of Figs. 1 and 2 is highly desirable for installations wherein the driving mechanisms are to be placed side by side. However, a modified linkage will be discussed with reference to Figs. 7, 8 and 9.

Figure 7:
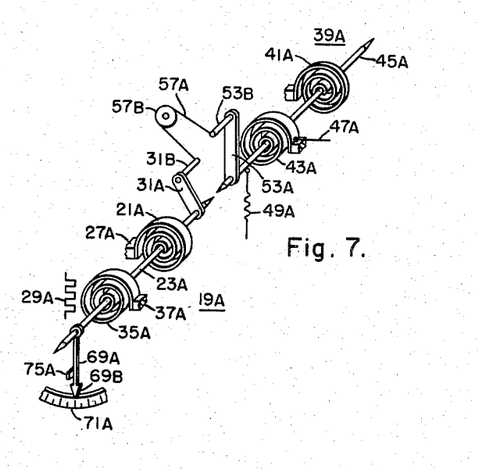
Fig. 7 is a view in perspective and Fig. 8 is a view in side elevation of a modified form of the invention.
Figure 8:
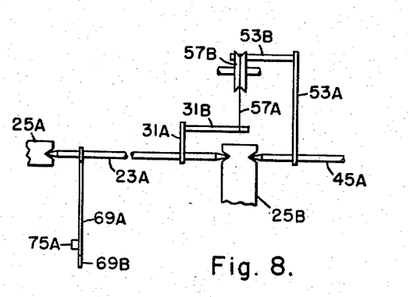
Figure 9:
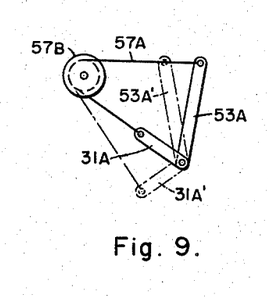
Fig. 9 is a view in front elevation of linkage employed in the structure of Fig. 7.

In the embodiment of Figs. 7, 8 and 9 a current-responsive driving mechanism 19A and a voltage-responsive driving mechanism 39A are provided which correspond respectively to the mechanisms 19 and 39 of Figs. 1 and 2. Thus, the current-responsive driving mechanism 19A includes spiral multi-metallic springs 21A and 35A and a shaft 23A which correspond to the springs 21 and 35 and the shaft 23 of Fig. 1.

The arm 31A is secured to the shaft 23A and corresponds to the arm 31 of Fig. 1. However, the arm 31A is located at the rear of the driving mechanism 19A and has a pin 31B projecting from its free end.

A pointer 69A is secured directly to the shaft 23A and has a target or point 69B positioned for movement adjacent the fixed scale 71A.

A heater 29A corresponds to the heater 29 of Fig. 1. With the specific structure illustrated in Fig. 7, an increase in current flowing through the heater 29A should result in a counterclockwise rotation of the shaft 23A. The heater 29A is associated with the front spring 35A to provide such rotation. The rear spring 21A is heated only in accordance with ambient temperature for providing ambient temperature compensation. It will be recalled that an increase in temperature of the spring 21A increases the clockwise torque exerted on the shaft by the spring.

The pointer 69A may be provided with a lip 75A which corresponds to the lip 75 of Fig. 2. The lip 75A may be employed in a similar manner for driving a maximum demand pointer in the up-scale direction. However, the maximum demand pointer is not reproduced in Fig. 7.

The shaft 23A may be mounted for rotation with respect to the supporting structure in any suitable manner as by means of bearings 25A and 25B.

The voltage-responsive driving mechanism includes spiral multi-metallic springs 41A and 43A and a shaft 45A which correspond respectively to the springs 41 and 43 and the shaft 45 of Fig. 1. Current is supplied to one of the springs by the conductors 47A and 49A which correspond to the conductors 47 and 49 of Fig. 1 and which are connected for energization in a similar manner.

In the specific embodiment of Fig. 7 current flowing through the conductors 47A and 49A should produce a torque acting in a counterclockwise direction about the shaft 45A. For this reason the conductors are connected to supply current to the front spring 43A of Fig. 7 to produce such a torque. The rear spring 41A is heated in accordance with ambient temperature to provide ambient temperature compensation. The spring 41A may have a width equal to half the width of the spring 43A for reasons discussed in connection with the embodiment of Fig. 1.

The arm 53A is secured to the shaft 45A and corresponds to the arm 53 of Fig. 1. The free end of the arm 53A is provided with a pin 53B which is parallel to the shaft 45A.

The shaft 45A may be mounted for rotation with respect to its supporting structure in any suitable manner. It will be noted that the shafts 23A and 45A are in alignment. For this reason the bearing 25B may be common to the two shafts as shown in Fig. 8.

Pins 31B and 53B are interconnected by a flexible elongated member 57A which extends around a pulley 57B. This pulley is mounted for rotation about an axis parallel to the axis of the shafts 23A and 45A. By inspection of Fig. 8, it will be noted that the pins 31B and 53B have portions extending into the plane of the pulley 57B. The elongated member 57A has its ends rotatably connected respectively to the pins 31B and 53B.

The elongated member 57A may have various constructions which are substantially inextensible in the direction of length. For example, the elongated member may be constructed of metallic or non-metallic flexible cord. Alternatively, the elongated member 57A may be in the form of a metallic chain.

A study of the embodiment of Figs. 7, 8 and 9 shows that the linkage interconnecting the two driving mechanisms operates in substantially the same manner as the linkage interconnecting the two driving mechanisms of Fig. 1. This may be understood readily by reference to Fig. 9. When the current-responsive driving mechanism 19A is deenergized the arm 31A may occupy the position illustrated by full lines in Fig. 9. In this position the arm 31A is aligned with the portion of the elongated member 57A extending between the arm and the pulley 57B. Consequently, when the current-responsive driving mechanism is deenergized the voltage-responsive driving mechanism has virtually no effect on the position of the arm 31A.

On the other hand, when the current-responsive driving mechanism 19A is substantially energized the arm 31A moves to a position represented in broken lines 31A′ in Fig. 9. In this position the arm is substantially at right angles to the portion of the elongated member 57A which extends between the arm and the pulley 57B. For this condition the voltage-responsive driving mechanism 39A strongly biases the arm 31A in a clockwise direction. Since the torque exerted by the voltage-responsive driving mechanism on the shaft 23A through the arm 31A increases substantially from zero to a maximum as the arm moves from the position 31A represented in full line in Fig. 9 to the position 31A′ represented in broken line, the square-law response of the current-responsive driving mechanism may be converted into a response of the pointer 69A which is more nearly a straight-line response. In other words, a given increment of current produces more nearly a definite displacement of the pointer 69A regardless of the position of the pointer at the time the increment is applied.

Because of the greater length of the arm 53A and the geometry illustrated in Fig. 9, the angle between the arm and the portion of the elongated member 57A extending between the arm and the pulley does not deviate appreciably from 90 degrees through the operating of the measuring instrument. Consequently, the voltage-responsive driving mechanism is sensitively associated with the current-responsive driving mechanism.

It will be understood that the lengths of the arms, the diameter of the pulley, the length of the elongated member and the positions of the various parts may be modified in accordance with the principles of geometry to obtain various responses of the measuring instrument. However, the positions and proportions illustrated in Fig. 9 have been found suitable for a measuring instrument.

When the arm 31A is displaced from its zero position shown in full line in Fig. 9, the voltage-responsive driving mechanism biases the current-responsive driving mechanism 19A in a clockwise direction as viewed in Fig. 9. An increase in current supplied to the spring 43A through the conductors 47A and 49A operates to decrease the force applied to the current-responsive driving mechanism by the voltage-responsive driving mechanism and consequently results in an increased reading of volt-amperes. It will be understood that the scale 71A like the scale 71 of Fig. 2 may be calibrated in volt-amperes.

The target 69B at the end of the pointer 69A is constrained for movement in a linear path. Although the linear path may be a straight line path an arcuate linear path has advantages and is illustrated in Fig. 7. Thus, the target 69B in Fig. 7 operates along a line which is a segment of a circle having its center on the axis of the shaft 23A. In a similar manner the tip of the pointer 69 in Fig. 2 is constrained for linear movement. The adjective "linear" means "of or pertaining to a line" or "resembling a line" wherein the line may be arcuate or curved.

This application is a continuation-in-part of my co-pending patent application, Serial No. 186,948, filed September 27, 1950.

Although the invention has been described with reference to a particular embodiment thereof, numerous

I claim as my invention:

1. In a device responsive to the volt-amperes of an electrical circuit, a supporting structure, a first shaft, a seecond shaft parallel to the first shaft, said shafts being mounted for independent rotation relative to the supporting structure, first current-responsive driving mechanism for applying a torque to the first shaft, second voltage-responsive driving mechanism for applying a torque to the second shaft, first and second torque arms for said first and second shafts respectively, an integral link member having a pair of ends each pivotally connected to a separate one of said torque arms, said link member and torque arms being proportioned to make rotation of one of said shafts substantially responsive to the volt-amperes of a circuit connected to energize the driving mechanisms, a scale element calibrated in volt-amperes, and an indicating pointer mounted for pivotal movement about an axis to traverse said scale element in accordance with rotation of said one of said shafts.

2. In a device responsive to the volt-amperes of an electrical circuit, a supporting structure, a first shaft, a second shaft parallel to the first shaft, said shafts being mounted for independent rotation relative to the supporting structure, first and second multi-metallic spiral springs each constructed of layers of material having different temperature coefficients of expansion, said first spring being effective when heated to apply a torque to said first shaft, said second spring being effective when heated to apply a torque to said second shaft, first and second torque arms for said first and second shafts respectively, an integral link member having a pair of ends each pivotally connected to a separate one of said torque arms, said link member and torque arms being proportioned to make rotation of one of said shafts substantially responsive to the volt-amperes of a circuit connected to heat the springs, a scale element calibrated in volt-amperes, and an indicating pointer mounted for pivotal movement about an axis to traverse said scale element in accordance with rotation of said one of said shafts.

3. In a device responsive to the volt-amperes of an electrical circuit, a supporting structure, a first shaft, a seecond shaft parallel to the first shaft, said shafts being mounted for independent rotation relative to the supporting structure, first current-responsive driving mechanism for applying a torque to the first shaft, second voltage-responsive driving mechanism for applying a torque to the second shaft, first and second torque arms for said first and second shafts respectively, and a linkage extending between and pivotally connected to said torque arms, said linkage and torque arms being proportioned to make rotation of one of said shafts substantially responsive to the volt-amperes of a circuit connected to energize the driving mechanisms, the change in torque applied to the first shaft through the linkage as a result of an increase in energization of the second driving mechanism being in the same direction as the change in torque applied to the first shaft as a result of an increase in energization of the first driving mechanism.

4. In a device responsive to the volt-amperes of an electrical circuit, a supporting structure, a first shaft, a second shaft, means mounting the shafts for independent rotation relative to the structure, first and second temperature-responsive spiral multi-metallic means wound about the first shaft and acting in opposite directions between the first shaft and the structure, third and fourth temperature-responsive spiral multi-metallic means wound about the second shaft and acting in opposite directions between the second shaft and the supporting structure, means for energizing the first temperature-responsive spiral multi-metallic means in accordance with the electrical current of an electrical circuit for applying a torque to the first shaft, means for energizing the third temperature-responsive spiral multi-metallic means in accordance with the electrical voltage of an electrical circuit for applying a torque to the second shaft, first and second torque arms for said first and second shafts respectively, an integral link member having a pair of ends each pivotally connected to a separate one of said torque arms, said link member and torque arms being proportioned to make rotation of one of said shafts substantially responsive to the volt-amperes of a circuit from which the first and third temperature-responsive spiral multi-metallic means are energized, a scale element calibrated in volt-amperes, and an indicating pointer mounted for pivotal movement about an axis to traverse said scale element in accordance with rotation of said one of said shafts.

5. In a device responsive to the volt-amperes of an electrical circuit, a supporting structure, a first shaft, a second shaft, means mounting the shafts for independent rotation relative to the structure, first and second temperature-responsive spiral multi-metallic means wound about the first shaft and acting in opposite directions between the first shaft and the structure, third and fourth temperature-responsive spiral multi-metallic means wound about the second shaft and acting in opposite directions between the second shaft and the supporting structure, means for energizing the first temperature-responsive spiral multi-metallic means in accordance with the electrical current of an electrical circuit, means for energizing the third temperature-responsive spiral multi-metallic means in accordance with the electrical voltage of an electrical circuit, an operated member operable in a unidimensional path, and coupling means coupling the shafts to the operated member for operating the operated member in accordance with the volt-amperes of a circuit from which the first and third temperature-responsive spiral multi-metallic means are energized, said third temperature-responsive spiral multi-metallic means comprising a pair of similar spiral multi-metallic springs having inner ends mechanically connected to the second shaft and acting in the same direction between the second shaft and the supporting structure, said fourth temperature-responsive spiral multi-metallic means comprising a spring similar to said first-named springs but acting in opposition to the first-named springs between the second shaft and the supporting structure, said first-named springs and said last-named spring being substantially enclosed in separate heat insulating housings whereby said last-named spring is unaffected by heat emanating from said first-named springs.

6. In a device responsive to the volt-amperes of an electrical circuit, a supporting structure, a first shaft, a second shaft parallel to the first shaft, said shafts being mounted for independent rotation relative to the supporting structure, first driving mechanism responsive to current flowing in the electrical circuit for rotating said first shaft in accordance with said current, second driving mechanism responsive to voltage of the electrical circuit for rotating said second shaft in accordance with said voltage, first and second torque arms for said first and second shafts respectively, an integral link member having a pair of ends each pivotally connected to a separate one of said torque arms, said link member and torque arms being proportioned to make rotation of one of said shafts substantially responsive to the volt-amperes of said circuit, a scale element calibrated in volt-amperes, first and second indicating pointers cooperating with said scale element, and coupling means coupling said one of said shafts to said first pointer for effecting movement of said first pointer in accordance with rotation of said one of said shafts, said second pointer cooperating with said first pointer to indicate maximum movement of said first pointer in a predetermined direction.

7. In a device responsive to the volt-amperes of an electrical circuit, a supporting structure, a first shaft, said shaft being mounted for rotation relative to the supporting structure, current-responsive driving mechanism for applying a torque to the first shaft, voltage-responsive resilient means, coupling means coupling the resilient means to the first shaft for resiliently opposing rotation of the first shaft by the driving mechanism, said coupling means including linkage for transmitting a proportion of the force developed by the resilient means to the first shaft which increases as the first shaft moves angularly about its axis from the position which it occupies when the current-responsive driving means is deenergized, the resilient means developing a force which is an inverse function of voltage energizing the voltage-responsive resilient means.

8. In an electrical measuring device for measuring energy and volt-amperes of an electrical circuit, a watt-hour meter having voltage and current windings, a current-responsive driving mechanism having a first shaft, a voltage-responsive driving mechanism having a second shaft, means mounting the driving mechanisms adjacent the watthour meter with said shafts parallel to each other, said driving mechanisms being displaced relative to each other angularly about an axis parallel to said first shaft, said voltage-responsive driving mechanism being connected for energization with said voltage winding from a common voltage source, said current-responsive driving mechanism being connected for energization with said current winding from a common current source, linkage connecting said shafts for operating one of the shafts in accordance with the volt-amperes of an electrical circuit from which the device is energized, a scale element calibrated in volt-amperes, and indicating pointer cooperating with said scale element, and coupling means coupling said one of said shafts to said pointer for rotating the pointer about a second axis lying in a plane intermediate the planes containing said first and second shafts.

9. A combined electromagnetic and thermo-responsive measuring assembly for measuring polyphase quantities in a polyphase circuit which comprises an electromagnetic measuring device having first and second elements, each of said elements comprising voltage and current windings effective when energized for producing a shifting magnetic field, said measuring device having armature means responsive to said magnetic fields, a polyphase thermo-responsive measuring device having first and second terminals for receiving current inputs from the phases of a polyphase circuit, first and second current transformers, first connection means connecting the current windings of the first element and the first terminals of the thermo-responsive measuring device for energization from the secondary of the first current transformer, and second connection means connecting the current windings of the second element and the second terminals of the thermo-responsive measuring device for energization from the secondary of the second current transformer.

10. In a measuring assembly, a sequence current filter having first and second terminals for receiving current inputs from the phases of a polyphase circuit, said sequence current filter having an output representative of a sequence component of current flowing in a polyphase circuit from which the filter is energized, first and second current transformers for supplying current respectively to said first and second terminals, said transformers having different transformation ratios, and a polyphase measuring device having first and second elements, each of the elements including current windings, said measuring device having common translating means responsive to the combined energizations of the elements, connection means for energizing the first terminals and the current windings of the first element from one of the current transformers, and connection means for energizing the second terminals and the current windings of the second element from the second transformer, said first and second current windings having different numbers of turns proportioned to produce the same number of ampere turns for the same primary energization for the primaries of the current transformers.

11. In an electrical measuring device for measuring energy and volt-amperes of an electrical circuit, a watt-hour meter, a voltage-responsive thermomotive device having a first shaft, a current-responsive thermomotive device having a second shaft, said thermomotive devices cooperating to produce a resultant response which is a function of volt-amperes of said electrical circuit, means mounting said thermomotive devices adjacent said watthour meter to have said shafts parallel to one another, said thermomotive devices being displaced relative to each other angularly about an axis parallel to said shafts, a scale element calibrated in volt-amperes, an indicating pointer cooperating with said scale element, and coupling means coupling one of said shafts to said pointer for rotating the pointer about a second axis lying in a plane intermediate the planes containing said first and second shafts.

12. In a device responsive to the volt-amperes of an electrical circuit, an operated member, first driving mechanism responsive to current flowing in the electrical circuit for operating the operated member in accordance with current flowing in the electrical circuit, second driving mechanism responsive to the voltage of said electrical circuit, linkage connecting the two driving mechanisms for operating the operated member in accordance with volt-amperes over a substantial range of voltage and current variation with each value of volt-amperes represented only by a single position of the operated member, said linkage rendering the second driving mechanism ineffective for operating the operated member when the linkage is in the condition corresponding to a deenergized first driving mechanism, and a scale element cooperating with the operating member, said scale element being calibrated in volt-amperes.

13. In a device responsive to the volt-amperes of an electrical circuit, a supporting structure, a first shaft, a second shaft parallel to the first shaft, said shafts being mounted for independent rotation relative to the supporting structure, first current-responsive driving mechanism for applying a torque to the first shaft, second voltage-responsive driving mechanism for applying a torque to the second shaft, first and second torque arms for said first and second shafts respectively, and a linkage extending between and pivotally connected to said torque arms, said linkage and torque arms being proportioned to make rotation of one of said shafts substantially responsive to the volt-amperes of a circuit connected to energize the driving mechanism, said linkage comprising a link which with the torque arm of the first driving mechanism is substantially in alignment when the first driving mechanism is deenergized.

14. A combined electromagnetic and thermo-responsive measuring assembly for measuring polyphase quantities in a polyphase circuit which comprises an electromagnetic measuring device having first and second elements, each of said elements comprising voltage and current windings effective when energized for producing a shifting magnetic field, said measuring device having armature means responsive to said magnetic fields, a polyphase thermoresponsive measuring device having first and second terminals for receiving current inputs from the phases of a polyphase circuit, first and second current transformers having different ratios of transformation, first connection means connecting the current windings of the first element and the first terminals of the thermo-responsive measuring device for energization from the secondary of the first current transformer, and second connection means connecting the current windings of the second element and the second terminals of the thermo-responsive measuring device for energization from the secondary of the second current transformer, the current windings of the two elements being designed respectively for energization by currents corresponding to the outputs of said current transformers.

15. A combined electromagnetic and thermoresponsive measuring assembly for measuring polyphase quantities in a polyphase circuit which comprises an electromagnetic measuring device having first and second elements, each of said elements comprising voltage and current windings effective when energized for producing a shifting magnetic field, said measuring device having armature means responsive to said magnetic fields, a polyphase thermoresponsive measuring device having first and second terminals for receiving current inputs from the phases of a polyphase circuit, first and second current transformers having different ratios of transformation, said thermoresponsive measuring device including a sequence current filter for deriving from the current inputs to said terminals a component representing the positive sequence component of current in a polyphase circuit from which the current transformers are energized, first connection means connecting the current windings of the first element and the first terminals of the thermoresponsive measuring device for energization from the secondary of the first current transformer, and second connection means connecting the current windings of the second element and the second terminals of the thermoresponsive measuring device for energization from the secondary of the second current transformer, the current windings of the two elements being designed respectively for energization by currents corresponding to the outputs of said current transformers.

16. In a device responsive to the volt-amperes of an electrical circuit, a supporting structure, an operated member, means mounting the operated member for movement relative to the supporting structure in a predetermined linear path, first electroresponsive driving mechanism coupled to the operated member for moving the operated member in said linear path in dependence on the energization of said driving mechanism, second electroresponsive driving mechanism coupled to the operated member for modifying movement of the operated member in said linear path in dependence on the energization of said second electroresponsive driving mechanism, the couplings of the driving mechanisms each serving to actuate the operated member from a first position towards a second position when the energization of the two driving mechanisms are both increased from first substantial values to second values, and means for energizing one of the driving mechanisms in accordance with current and the other of said driving mechanisms in accordance with voltage of an electrical circuit, the coupling of said mechanisms to the operated member being proportioned to move the operated member in said linear path in accordance with volt-amperes of the associated electrical circuit.

17. In a device responsive to the volt-amperes of an electrical circuit, a supporting structure, an operated member, means mounting the operated member for movement relative to the supporting structure in a predetermined linear path, first electroresponsive driving mechanism coupled to the operated member for moving the operated member in said linear path in dependence on the energization of said driving mechanism, second electroresponsive driving mechanism coupled to the operated member for modifying movement of the operated member in said linear path in dependence on the energization of said second electroresponsive driving mechanism, the couplings of the driving mechanisms each serving to actuate the operated member from a first position towards a second position when the energization of the two driving mechanisms are both increased from first substantial values to second values, and means for energizing one of the driving mechanisms in accordance with current and the other of said driving mechanisms in accordance with voltage of an electrical circuit, the coupling of said mechanisms to the operated member being proportioned to move the operated member in said linear path in accordance with volt-amperes of the associated electrical circuit, said mechanisms being coupled to each other to effect the application of a force to one of said mechanisms in response to a change in energization of the other of said mechanisms.

18. In a device responsive to the volt-amperes of an electrical circuit, a supporting structure, an operated member, means mounting the operated member for movement relative to the supporting structure in a predetermined linear path, first electroresponsive driving mechanism coupled to the operated member for moving the operated member in said linear path in dependence on the energization of said driving mechanism, second electroresponsive driving mechanism coupled to the operated member for modifying movement of the operated member in said linear path in dependence on the energization of said second electroresponsive driving mechanism, the couplings of the driving mechanisms each serving to actuate the operated member from a first position towards a second position when the energization of the two driving mechanisms are both increased from first substantial values to second values, and means for energizing one of the driving mechanisms in accordance with current and the other of said driving mechanisms in accordance with voltage of an electrical circuit, the coupling of said mechanisms to the operated member being proportioned to move the operated member in said linear path in accordance with volt-amperes of the associated electrical circuit, said first electroresponsive driving mechanism comprising an electroresponsive motor acting between the supporting structure and the operated member, said electroresponsive motor including resilient means through which the electroresponsive motor establishes a yieldable position for the operated member, and the second electroresponsive driving mechanism being coupled to the electroresponsive motor to move the electroresponsive motor relative to the supporting structure for modifying the position of the operated member in said linear path in response to a change in energization of the second electroresponsive driving mechanism.

19. In a device responsive to the volt-amperes of an electrical circuit, a supporting structure, an operated member, means mounting the operated member for movement relative to the supporting structure in a predetermined linear path, first electroresponsive driving mechanism coupled to the operated member for moving the operated member in said linear path in dependence on the energization of said driving mechanism, second electroresponsive driving mechanism coupled to the operated member for modifying movement of the operated member in said linear path in dependence on the energization of said second electroresponsive driving mechanism, and means for energizing one of the driving mechanisms in accordance with current and the other of said driving mechanisms in accordance with voltage of an electrical circuit, the coupling of said mechanisms to the operated member being proportioned to move the operated member in said linear path in accordance with volt-amperes of the associated electrical circuit, each of said electroresponsive driving mechanisms comprising a temperature-responsive multi-metallic resilient spring acting to deflect in response to a temperature change and means for electrically heating the spring, the coupling of said mechanisms acting to change the deflection of one of the springs in response to a change in energization of the other of said springs.

20. In a device responsive to the volt-amperes of an electrical circuit, a supporting structure, an operated member, means mounting the operated member for movement relative to the supporting structure in a predetermined linear path, first electroresponsive driving mechanism having a first part rotatable relative to the supporting structure in response to energization of the mechanism, second electroresponsive driving mechanism having a second part rotatable relative to the supporting structure in response to energization of the second electroresponsive driving mechanism, coupling mechanism coupling the driving mechanisms to apply to the first part a torque relative to the supporting structure in response to a change in energization of the second electroresponsive driving mechanism, the coupling mechanism being proportioned to make the rotation of the first part a function substantially of the product of the energizations of the driving mechanisms over a substantial range of variation of said energizations.

21. In a device responsive to the volt-amperes of an electrical circuit, a supporting structure, an operated member, means mounting the operated member for movement relative to the supporting structure in a predetermined linear path, first electroresponsive driving mechanism having a first part rotatable relative to the supporting structure in response to energization of the mechanism, second electroresponsive driving mechanism having a second part rotatable relative to the supporting structure in response to energization of the second electroresponsive driving mechanism, coupling mechanism coupling the driving mechanisms to apply to the first part a torque relative to the supporting structure in response to a change in energization of the second electroresponsive driving mechanism, the coupling mechanism being proportioned to make the rotation of the first part a function substantially of the product of the energizations of the driving mechanisms over a substantial range of variation of said energizations, said coupling mechanism comprising a torque arm on each of said parts, and a flexible, elongated device having a separate end connected to each of the torque arms.

22. In a device responsive to the volt-amperes of an electrical circuit, a supporting structure, an operated member, means mounting the operated member for movement relative to the supporting structure in a predetermined linear path, first electroresponsive driving mechanism having a first part rotatable relative to the supporting structure in response to energization of the mechanism, said driving mechanism comprising a resilient, temperature responsive spring extending between the first part and the supporting structure and electrical means for heating the spring, second electroresponsive driving mechanism having a second part rotatable relative to the supporting structure in response to energization of the second electroresponsive driving mechanism, coupling mechanism coupling the driving mechanisms to apply to the first part a torque relative to the supporting structure in response to a change in energization of the second electroresponsive driving mechanism, the coupling mechanism being proportioned to make the rotation of the first part a function substantially of the product of the energizations of the driving mechanisms over a substantial range of variation of said energizations, said coupling mechanism comprising a torque arm on each of said parts, and a flexible, elongated device having a separate end connected to each of the torque arms, and a pulley rotatably mounted on the supporting structure for guiding said elongated device.

References Cited in the file of this patent
UNITED STATES PATENTS

| | | |
|---|---|---|
| 729,422 | Rypinski et al. | May 26, 1903 |
| 1,161,395 | Lincoln | Nov. 23, 1915 |
| 2,314,244 | Pratt | Mar. 16, 1943 |